United States Patent [19]

Lee et al.

[11] 4,079,223
[45] Mar. 14, 1978

[54] ELECTRODE SYSTEM FOR SPOT WELDING ALUMINUM AND OTHER DIFFICULT-TO-WELD MATERIALS

[75] Inventors: Sanford L. Lee, Midland; Robert H. Blair; Clifford H. Guenther, both of Bay City, all of Mich.

[73] Assignee: Resistance Welder Corporation, Bay City, Mich.

[21] Appl. No.: 712,372

[22] Filed: Aug. 9, 1976

[51] Int. Cl.² .................... B23K 11/06; B23K 11/10
[52] U.S. Cl. .................................... 219/86.7; 219/81; 219/84; 219/118
[58] Field of Search ................ 219/81, 82, 83, 84, 219/86, 87, 108, 118, 119, 78

[56] References Cited

U.S. PATENT DOCUMENTS

| | | | |
|---|---|---|---|
| 1,640,244 | 8/1927 | McBerty | 219/81 |
| 2,231,408 | 2/1941 | Fechheimer et al. | 219/78 |
| 2,423,067 | 6/1947 | Hansen et al. | 219/81 |
| 2,755,366 | 7/1956 | Cartwright | 219/81 X |
| 3,564,193 | 2/1971 | Erlandson | 219/108 |
| 3,798,405 | 3/1974 | Boothe | 219/119 X |

*Primary Examiner*—J. V. Truhe
*Assistant Examiner*—N.D. Herkamp
*Attorney, Agent, or Firm*—Learman & McCulloch

[57] ABSTRACT

An electrode system for spot welding difficult-to-weld materials, such as aluminum, wherein a pair of spaced apart electrodes, one of which is a roller, clamp the overlapped strips of material to be spot welded. Mechanism moves the roller electrode toward and away from the other electrode, and other means is operated responsively to this movement for indexing the roller electrode incrementally circumferentially to successively present a new surface to the work held between the electrodes. A control circuit applies DC power to the electrodes such that the roller mentioned has the positive polarity and the other electrode the negative polarity.

4 Claims, 6 Drawing Figures

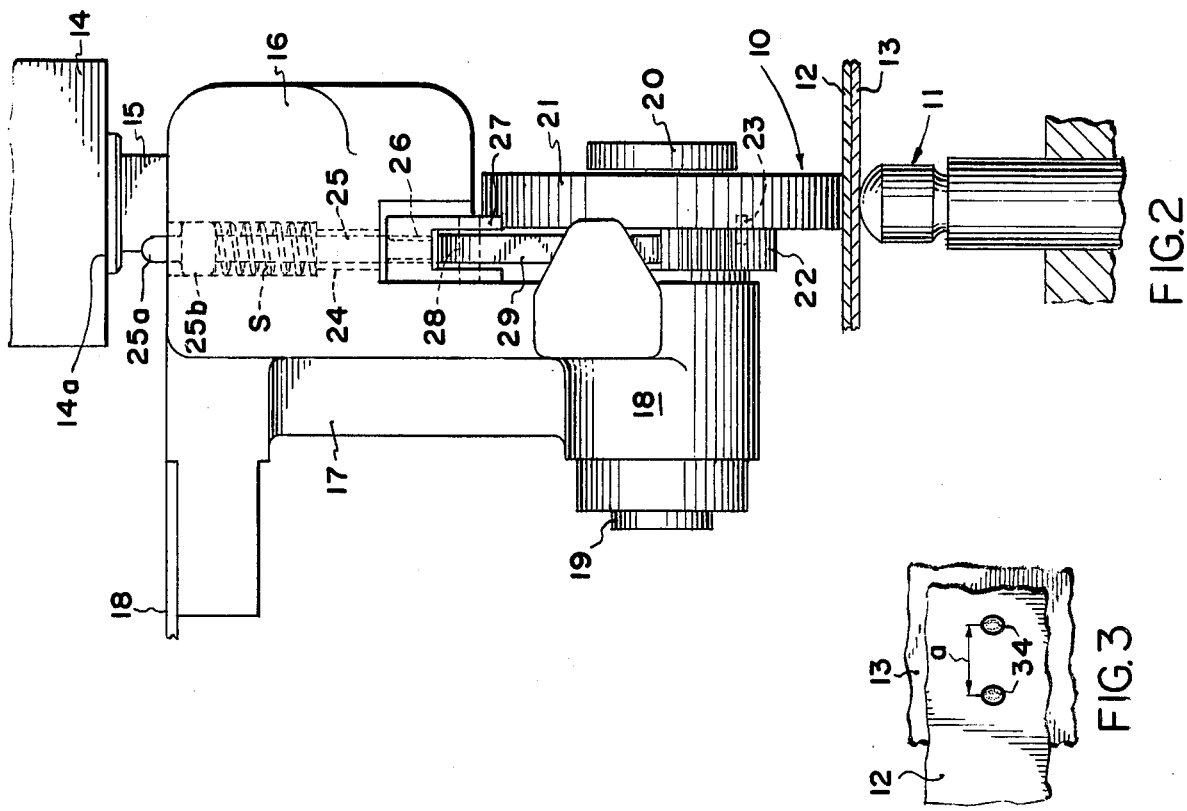
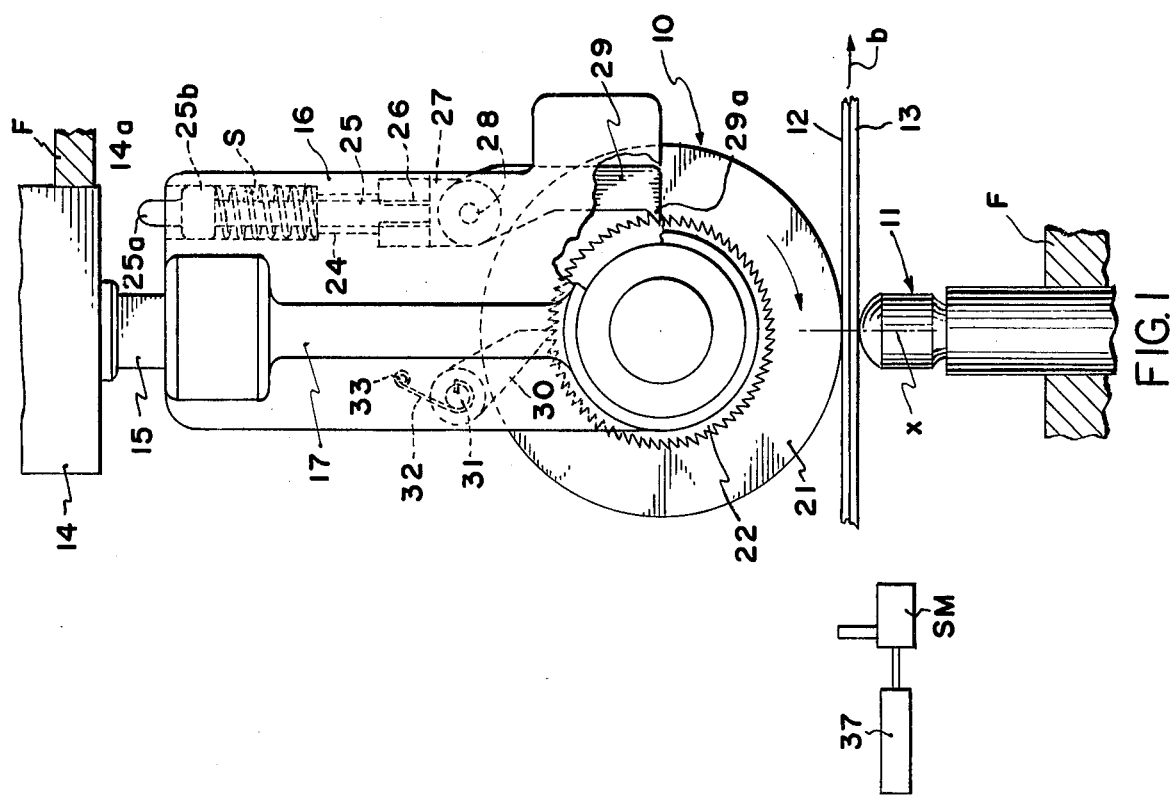
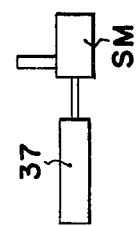

ns a coating of aluminum tends to be deposited on the copper electrodes between which the material to be spot welded is clamped and particularly the positive electrode. This tendency to "spot" or coat limits the number of welds which can be successfully performed with a particular set of electrodes. Moreover, aluminum deposited previously on the positive electrode will contaminate a subsequent weld while also interfering with the heat and current transfer characteristics of the material. Further, due to the buildup of aluminum on the positive electrode, the underlying copper core of conventional electrode systems is depressed during the pressure welding operation and then, when the aluminum subsequently tears away, a crater mars the profile of the electrode and interferes with its welding characteristics.

ELECTRODE SYSTEM FOR SPOT WELDING ALUMINUM AND OTHER DIFFICULT-TO-WELD MATERIALS

BACKGROUND OF THE INVENTION

The direct current spot welding of aluminum presents some special problems in that during welding operations a coating of aluminum tends to be deposited on the copper electrodes between which the material to be spot welded is clamped and particularly the positive electrode. This tendency to "spot" or coat limits the number of welds which can be successfully performed with a particular set of electrodes. Moreover, aluminum deposited previously on the positive electrode will contaminate a subsequent weld while also interfering with the heat and current transfer characteristics of the material. Further, due to the buildup of aluminum on the positive electrode, the underlying copper core of conventional electrode systems is depressed during the pressure welding operation and then, when the aluminum subsequently tears away, a crater mars the profile of the electrode and interferes with its welding characteristics.

When a spot of aluminum freezes or coats on an electrode it disturbs the distribution pattern of the current when the next weld is made. This occurs because the heat resistance is different at the location where the aluminum is coated on, and hot and cold spots are formed on the profiled electrodes. Normally, if electrode tips hold their contour there is an epicenter of heat application. If there is a deposition of metal on some part of the electrode tip, an uneven heat resistance is created and heat is drawn away from the weld epicenter, which then is colder than normal. The geometric symmetry of heat distribution is further disturbed if part of the aluminum is later torn off, or if a crater is formed during the pressure welding operation as a result of deformation of the copper electrode to receive the thickness of the aluminum deposit.

During a prefiling investigation which was made in this case, the following patents were cited and are made of record herein:

U.S. Pat. No. 3,715,558
U.S. Pat. No. 3,655,938
U.S. Pat. No. 3,115,570
U.S. Pat. No. 2,684,424
U.S. Pat. No. 2,404,632
U.S. Pat. No. 2,354,313
U.S. Pat. No. 2,209,932
U.S. Pat. No. 1,640,244
U.S. Pat. No. 1,360,948
U.S. Pat. No. 1,177,260
U.S. Pat. No. 1,155,497

One of the prime objects of the present invention is to provide an electrode system which has a far greater operating life than conventional systems and can, for example, perform in the neighborhood of 5,000 aluminum welds in comparison with the 270 aluminum welds obtained with conventional systems.

A further object of the invention is to provide an electrode system in which the positive electrode is a circumferentially indexible roller which is indexed sufficiently to present a fresh peripheral surface to the work to be welded, automatically, responsive to retraction of the positive electrode to release the material welded.

SUMMARY OF THE INVENTION

A DC applying electrode system wherein the positive electrode is a roller which is peripherally indexed responsive to movement of the roller electrode away from the other electrode to present a new surface to the work held between the electrodes on the return stroke of the roller electrode.

Other objects and advantages of the invention will be pointed out specifically or will become apparent from the following description when it is considered in conjunction with the appended claims and the accompanying drawings, in which:

FIG. 1 is a side elevational view of the electrode assembly with parts partly broken away to more clearly illustrate the mechanism;

FIG. 2 is an end elevational view thereof;

Figure 4:
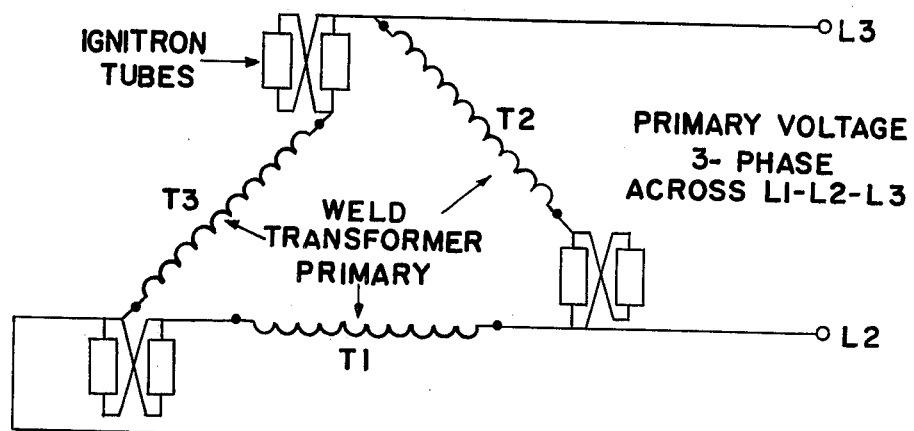
Figure 5:
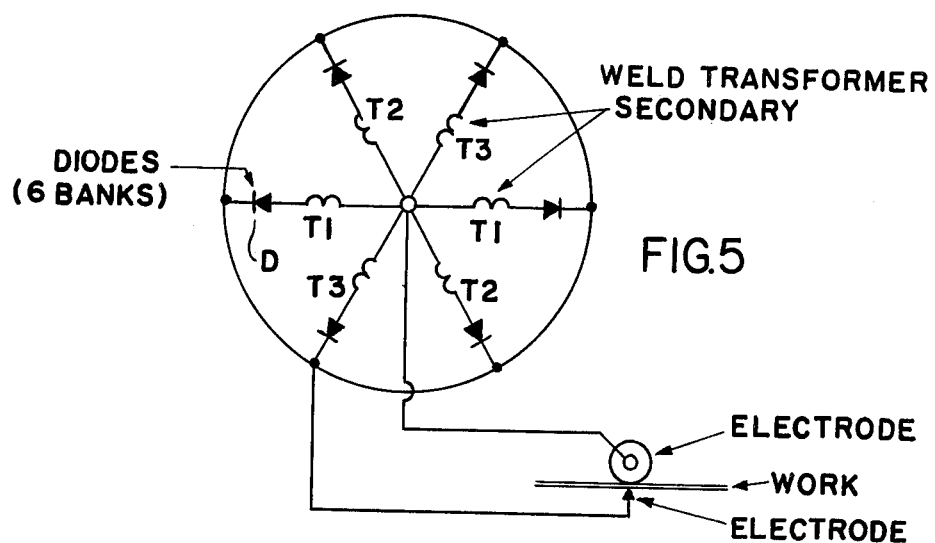
Figure 6:
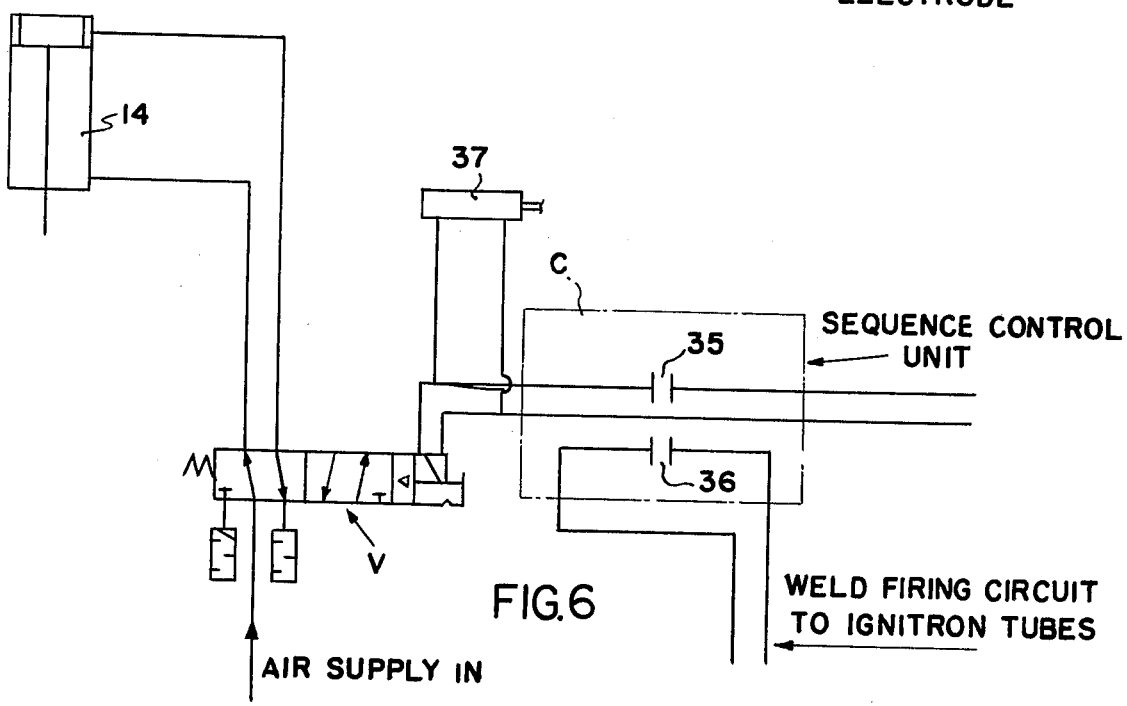

FIG. 3 fragmentarily shows strips of material shows joined by typical spot welds;

FIG. 4 is a schematic diagram showing the weld transformer primary circuit;

FIG. 5 is a typical schematic diagram illustrating the weld transformer secondary unit; and FIG. 6 schematically illustrates a control circuit for the system.

Referring now more particularly to the accompanying drawings and in first instance to FIGS. 1 and 2, the electrode system comprises generally an upper positive electrode, generally designated 10, in the form of an indexible roller, and a lower, fixed electrode 11 between which are sandwiched a pair of sheets or strips 12 and 13 to be joined together by spot welding. It is to be understood that the sheets 12 and 13 are aluminum sheets, or other difficult-to-weld sheets of material such as galvanized sheet. Electrode tip pickup problems have limited the number of welds which a given set of electrodes could satisfactorily accomplish in prior art systems for the reasons previously mentioned.

In the embodiment of the invention which is illustrated, a hydraulic cylinder 14 fixed to frame F has a piston rod 15 mounting electrode 10, while electrode 11 is a fixed electrode, also supported by frame F.

As FIG. 2 particularly indicates, the roller assembly electrode 10 includes a non-conductive body part 16, fixed to the end of piston rod 15, which has a conductive copper connector member 17 mounted thereon. A conductor strap 18 for delivering direct current to the assembly 10 via a suitable control circuit to be described may be fixed to the member 17 in any suitable manner. A bearing 18 integrally provided on the member 17 journals a conductive shaft 19 which may be tubular so that it can be water-cooled in a manner not illustrated, inasmuch as it forms no part of the present invention.

A retainer cap 20 can be used at the opposite end of the shaft 19 to secure a rotatable roller electrode 21 in axial position on shaft 19. It is to be understood that the shaft 19 is also formed from a conductive material such as copper to transmit welding current to the roller electrode 21 which is mounted for rotation on shaft 19. Both electrodes 11 and 21 may be nickel plated copper electrodes. Also mounted for rotation on the shaft 19 is a ratchet wheel 22, which may be pinned as at 23 to the roller electrode 21, so that movement of the toothed wheel 22 through a rotary increment will also move the roller 21 through a rotary increment.

The body part 16 is recessed as at 24 to accommodate an actuator rod or slide 25 which has an upper end 25a disposed vertically beneath an abutment surface on the end wall 14a of cylinder 14. At its lower end the rod 25 is received in a recess 26 provided in a clevis 27. The clevis 27 supports a mount pin 28 for a ratchet 29 having a toothed lower end 29a which is normally engaged between the teeth of the ratchet wheel 22. Near its upper end the rod 25 is enlarged as at 25b and a return coil spring S is provided which urges the rod 25 upwardly. While ratchet 29 is free to pivot about the pin 28, it will be noted that it is eccentrically supported so that the forces of gravity tend to maintain the pawl tooth 29a in meshed position between the teeth of ratchet wheel 22, as illustrated in FIG. 1.

It is to be understood that the piston rod 15 is shown in extended position and, when it is retracted, the upper end 25a of rod 25 will contact the abutment surface 14a on cylinder 14, thus forcing rod 25 and pawl 29 downwardly one tooth, or preferably a distance corresponding to three teeth of wheel 22. For this reason, and because the number of teeth on ratchet wheel 22 is not a multiple of three, each full revolution of roller 21 does not result in contact of the same peripheral portion of roller 21 with the weld epicenter line x. Provided to prevent the return rotation of roller wheel 21, is a locking pawl 30 mounted for pivoting movement on a pin 31 provided on body 16. A torsion spring 32, secured at one end to a retainer pin 33, resiliently biases the locking pawl 30 to maintain the positin in which it is shown in FIG. 1, and restores it to this position.

It is to be understood that the actuator rod 25 is insulated from the wheel 21. As FIG. 3 indicates, spot welds 34 are being effected to connect sheets or strips 12 and 13, and these spot welds 34, which may be termed discontinuous, are separated by a distance a.

A typical sequence control C (model S2H) of the type manufactured by General Electric Company, Robotron Company, Technitron Company, or Weltronic Company may be employed to supply welding current to the electrodes 10 and 11. The center tap transformer in these controls obtains full wave rectification with 180° out-of-phase transformer secondary coils T1 through T3 which, via diodes D, transmit a direct current to the electrode system. The ignitron tubes I operate in the usual manner to "fire" the system for a predetermined number of half-cycles of alternating current as "set" on the control. While a three phase power source is illustrated, it should be understood that a single phase source may also be employed.

FIG. 6 shows a schematic electro-pneumatic control circuit in which the cylinder 14 is depicted as being operated by a commercially available, solenoid operated, spring returned valve V which is operated by control contacts 35. Control contacts 36 "fire" the ignitron tubes when a predetermined welding pressure, i.e., 1000 p.s.i., is being achieved by cylinder 14 forcing the wheel 21 downwardly to securely clamp the workpieces 12 and 13 between the electrodes 10 and 11.

THE OPERATION

Assuming the parts to be in the welding position shown in FIGS. 1 and 2, and the weld as having just been coompleted, the contacts 35 will be made to adjust the stem of valve V to admit air to retract piston rod 15. The valve V will supply air under pressure to the lower end of cylinder 14 while, egressing it from the upper end to atmosphere. This raises the entire electrode assembly 10 and the end 25a of rod 25 moves into engagement with the abutment face 14a of the cylinder, with the result that rod 25 is forced downwardly and the wheel 22 is moved through a peripheral rotation equal to typically three teeth. When this occurs, pawl 30 is pivoted in a counterclockwise direction, and only prevents further clockwise rotation of the roller or wheel 21 when the pawl 29 has completed its downward stroke. As the roller assembly 10 is raising, the sheets 12 and 13 are moved laterally in the direction b by an appropriate shuttle member SM powered by cylinder 37.

The electrode system pictured may be part of a multiple weld station in which products are delivered for welding simultaneously by a series of such electrode assemblies, or may be of the type wherein the workpieces 12 and 13 are simply indexed in longitudinal increments along the direction line b to dispose spaced apart locations to spot welds 34, as demonstrated in FIG. 3. In any event, once the work has been moved in the manner desired within the time frame allowed for this purpose, contacts 35 will be broken and air under pressure will be supplied to the opposite end of cylinder 14, while air is being egressed from the lower end, to operate it to extend the piston rod 15 and force the wheel 21 downwardly into pressurized engagement with the workpieces 12 and 13. At this time welding current is applied via "firing" of the ignition tubes in the control C, with making of the contacts 36. The welding current and welding pressure are applied for a time interval which can be "set" in the usual manner on control C.

In a direction current system of the character described, the position electrode is the one which tends to get the coating when material such as aluminum is being spot welded. It is for this reason that the positive electrode is in the shape of an indexible roller or wheel which can successively present a fresh peripheral surface to the workpiece it engages. The indexing of the wheel occurs at a time when the weld current is disconnected and the wheel assembly 10 is in fact physically removed from the workpiece. This concept is to be distinguished from a seam welding process wherein a continuous, as distinguished from a discontinuous, weld is involved and wherein the electrodes are not vertically removed from engagement with the work.

In the present case, indexing of the wheel 21 through a predetermined rotary increment is effected automatically and mechanically as a result of, and responsive to, withdrawal movement of the electrode assembly. Indexing of the work occurs when the roller is in a removed vertical position and after the time of weld current application, so that the welded material can be moved from between the electrodes without pulling any material away from the surface of the workpieces. Because a DC system is employed, the system is more versatile, since the power pack can be located remotely from the electrodes and need not obstruct the tool area. In AC systems, the transformers have to be physically located near the weld area.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. An electrode system for spot welding difficult-to-weld material such as aluminum comprising: means for rectifying an AC current source to provide DC power;

a support frame; a pair of frame supported, spaced apart electrodes between which the overlapped strips of material to be spot welded are located; a fluid pressure operated axially extending drive ram on said frame for moving one of the electrodes in a reciprocatory linear path toward and away from the other electrode to engaged, welding pressure applying position and to a remote withdrawn position; and mechanism for relatively moving the material and electrodes laterally when the said one electrode is withdrawn;

the improvement wherein;

a shaft mounting bearing assembly is mounted on the end of the ram and the said one electrode comprises a roller on the shaft; a rotatable drive part is fixedly connected to the roller electrode such as to rotatably index it in one direction of rotation; mechanism is provided on said assembly for preventing rotation of the drive part and roller electrode in the other direction of rotation; a to and fro moving drive member extending generally parallel to the ram axis and engaged with the rotatable drive part, carried by the bearing assembly for movement in a drive stroke generally parallel to the axis of the ram to rotate the rotatable drive part and thereby index the electrode; means for operating the drive member responsively to movement of the roller electrode in said path only when the roller electrode is in a withdrawn position to advance the roller electrode circumferentially and present a different surface to the strips between the electrodes when the roller is subsequently returned to welding position; and a control circuit is provided for applying DC power to the electrodes such that the roller has the positive polarity and the other electrode the negative polarity, when the bearing assembly and thereby said one roller is moved to engaged position and a predetermined welding pressure is applied by the ram.

2. The system of claim 1 including the further improvement wherein at least a portion of the drive member is mouunted to be swingable away from the rotatable drive part during its return stroke.

3. The system as set forth in claim 2 in which the ram comprises a movable piston and a fixed cylinder and the drive member includes a slide part protruding outwardly from said bearing assembly in position to be engaged by and depressed by the ram cylinder to index the said roller electrode when the bearing assembly is moving to withdrawn position.

4. The system as set forth in claim 2 and including the further improvement wherein the drive member includes a toothed drive part and a ram engaging part; the toothed drive part being pivotally mounted off center on the ram engaging part to be weight biased into engagement with said rotatable drive part, the rotatable drive part being a toothed ratchet wheel arranged with the toothed drive part's driving stroke to index the ratchet wheel three or a greater odd number of teeth with each driving stroke, and return spring means being provided in said bearing assembly for normally biasing the ram engaging part to outwardly projected position.

* * * * *

UNITED STATES PATENT AND TRADEMARK OFFICE
CERTIFICATE OF CORRECTION

PATENT NO. : 4,079,223
DATED : March 14, 1978
INVENTOR(S) : Sanford L. Lee et al It is certified that error appears in the above-identified patent and that said Letters Patent are hereby corrected as shown below:

column 2, line 18, after "material" omit --shows-- column 3, line 31, after "connect" insert "the"

column 3, line 61, change "coompleted" to --completed-- column 4, line 12, after "electrode" omit --as-- column 4, line 25, change "ignition" to --ignitron-- column 4, line 30, change "direction" to --direct-- column 6, line 10, change "mouunted" to --mounted--

Signed and Sealed this

Eighth Day of August 1978

[SEAL]

Attest:

RUTH C. MASON
*Attesting Officer*

DONALD W. BANNER
*Commissioner of Patents and Trademarks*